Oct. 8, 1929.　　　K. E. LYMAN　　　1,730,516

BRAKE OPERATING MEANS

Filed June 2, 1927

INVENTOR
KENNETH E. LYMAN
BY
ATTORNEY

Patented Oct. 8, 1929

1,730,516

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE-OPERATING MEANS

Application filed June 2, 1927. Serial No. 195,897.

This invention relates to brakes and is illustrated as embodied in novel operating mechanism for a front-wheel automobile brake. An object of the invention is to provide simple adjusting means, preferably of an automatic character, for compensating for wear of the brake.

The illustrated arrangement includes a novel eccentric thrust device between two levers or other operating members, one of which operates the brake and the other of which is operated by the usual driver-controlled connections.

The eccentric device can be turned to compensate for wear of the brake. I prefer to provide a stop, or equivalent means, arranged automatically to turn the eccentric device when the brake wears enough to permit excessive movement of the operating mechanism.

Various features of novelty relate to the form of the eccentric device, and to its mounting and its adjustment. All of these various features, and including desirable and novel structural details, will be apparent from the following description of the illustrative embodiments shown in the accompanying drawing, in which.

Figure 1:
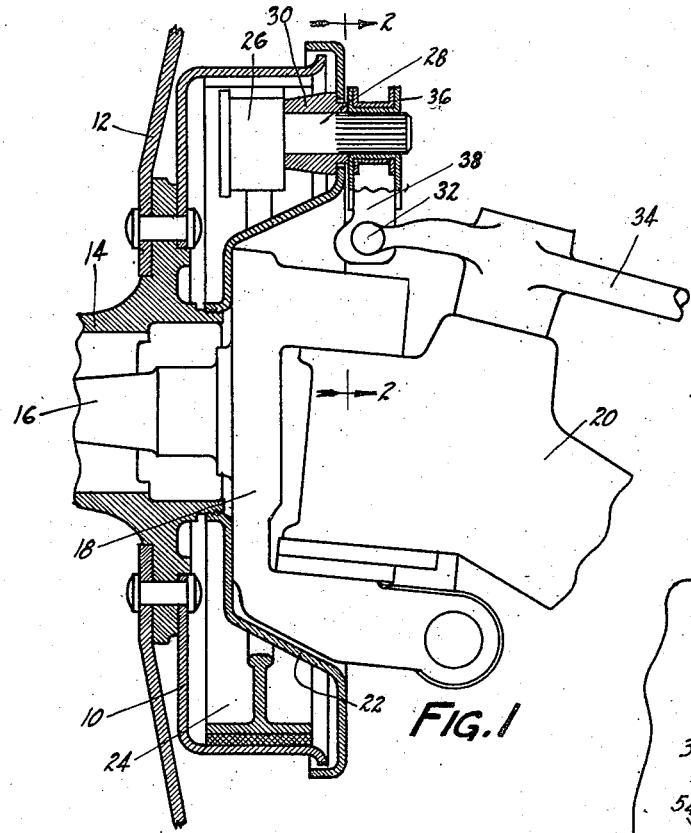
Figure 1 is a partial vertical section through one front brake and through associated parts.
Figure 3:
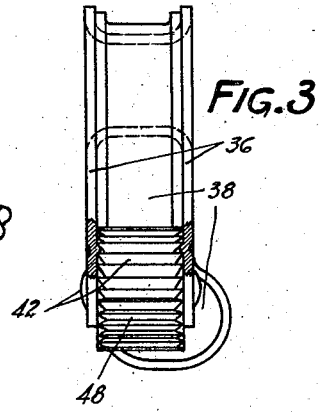
Figure 3 is a front elevation of the parts of Figure 2.

The parts shown in Figure 1 include a drum 10 rotating with a wheel 12 having a hub 14 on the spindle 16 of a knuckle 18 swivelled, by a king-pin or the like, at one end of an axle 20. The open side of drum 10 is closed by a backing plate 22 carried by the knuckle 18.

The brake proper includes shoes 24 operated by means such as a cam 26 carried by or integral with a shaft 28 journalled in a bracket 30 secured to the backing plate 22. Shaft 28 is operated by novel means engaged by an integral ball 32 on the end of a lever 34 pivoted on the axle 20. When the brake is applied, the center of ball 32 is arranged in or immediately adjacent the swivelling axis of the wheel.

The novel adjusting means is shown as arranged between two thrust members such as levers 36 and 38. Lever 36 has a hub portion encircling a serrated portion of shaft 28, and clamped to the shaft by means such as a contracting screw 40, thus fixing lever 36 on the shaft.

Lever 38 is formed at its upper end with a C-shaped open loop partially encircling the hub of lever 36, so that lever 38 may be regarded as loosely mounted on shaft 28. Lever 38 is engaged by the ball 32 of lever 34.

Lever 36 has parallel side portions, between which is pivoted a novel eccentric thrust device 42, preferably formed on one or both ends with ratchet teeth 44 engaged by a holding pawl 46 pressed integrally from the side of the lever.

Figure 4:
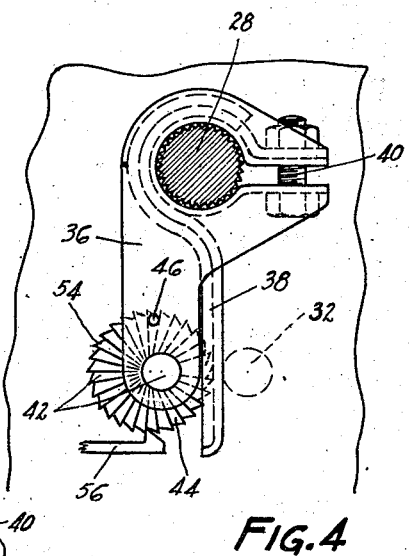
Figure 4 is a view corresponding to Figure 2, but showing a modification in which the adjustment is made as the brake is released, instead of as the brake is applied.
Figure 2:
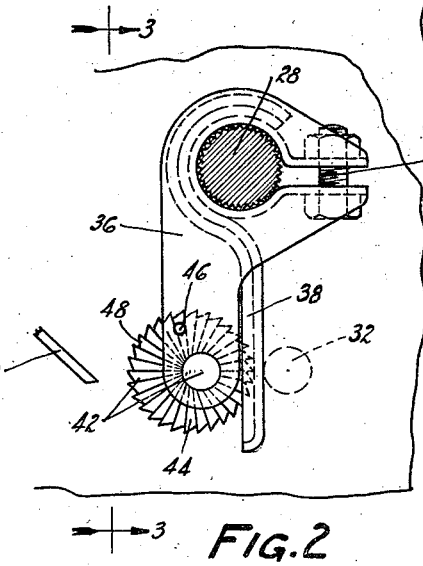
Figure 2 is a section on the line 2—2 of Figure 1, showing the novel adjusting parts in side elevation.

The device 42 is also formed with external ratchet teeth 48, and when the wear of the brake permits excessive movement of shaft 28 the teeth 48 engage a fixed stop or pawl 50 which shifts the device 42 one tooth. In the arrangement of Figure 4, device 42 is provided with teeth 54 facing the opposite way from teeth 48, and engaging a spring-pressed hooked stop or pawl 56, so that the adjustment is made as the brake is released, instead of during the application of the brake as in Figure 2.

As the adjustments are made from time to time, and since lever 38 engages the eccentric device 42 in order to operate lever 36, the levers are gradually shifted angularly with respect to each other, sufficiently to compensate for the wear of the brake.

While two illustrative embodiments have been described in detail, it is not my intention to limit the scope of the invention to those particular embodiments, or otherwise than by the terms of the appended claims.

I claim:

1. Brake-operating mechanism comprising two members, one of which operates the other and the said other of which operates the brake, in combination with an eccentric thrust device carried by one of said members and in disconnected thrust engagement with the other of said members, and means for automatically turning said device to compensate for wear of the brake.

2. Brake-operating mechanism comprising two members, one of which operates the other and the said other of which operates the brake, in combination with an eccentric thrust device between said members, and a stationary stop arranged to turn the eccentric in case of excessive brake-applying movement.

3. Brake-operating mechanism comprising, in combination, a shaft, two levers on the shaft and one of which is fixed on the shaft and the other of which is loose, operating means engaging the loose lever, and an eccentric thrust device through which the loose lever operates the fixed lever.

4. Brake-operating mechanism comprising, in combination, a shaft, two levers on the shaft and one of which is fixed on the shaft and the other of which is loose, operating means engaging the loose lever, an eccentric thrust device through which the loose lever operates the fixed lever, and means for automatically shifting the eccentric to compensate for wear of the brake.

5. Brake-operating mechanism comprising, in combination, a shaft, two levers on the shaft and one of which is fixed on the shaft and the other of which is loose, operating means engaging the loose lever, an eccentric thrust device through which the loose lever operates the fixed lever, and a stop arranged to turn the eccentric in case of excessive brake-applying movement of the shaft.

6. Operating mechanism comprising, in combination, a lever having spaced sides, an eccentric thrust device pivotally mounted between said sides and having external ratchet teeth, an operating member engaging the thrust device for actuating the lever, and a stop engageable with said teeth to turn the eccentric device in case of excessive movement of the lever.

7. Brake-operating mechanism for brake operating shafts comprising, in combination, a lever having spaced sides, an eccentric adjustable thrust device pivotally mounted between said sides, and an operating member engaging the thrust device for actuating the lever.

8. Operating mechanism for brake operating shafts comprising, in combination, a lever having spaced sides, an eccentric adjustable thrust device pivotally mounted between said sides, and an operating member engaging the thrust device for actuating the lever, said thrust device having ratchet teeth at least on one end, and at least one of said sides having a holding pawl part engaging said teeth.

In testimony whereof, I have hereunto signed my name.

KENNETH E. LYMAN.